United States Patent
Hessmert et al.

(10) Patent No.: US 6,494,282 B1
(45) Date of Patent: Dec. 17, 2002

(54) METHOD AND DEVICE FOR CONTROLLING A DRIVE UNIT OF A MOTOR VEHICLE

(75) Inventors: Ulrich Hessmert, Schwieberdingen (DE); Thomas Sauter, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/616,245

(22) Filed: Jul. 14, 2000

(30) Foreign Application Priority Data

Jul. 15, 1999 (DE) ........................... 199 33 087

(51) Int. Cl.$^7$ ............................... B60K 28/16
(52) U.S. Cl. ........................... 180/197; 701/84
(58) Field of Search ................ 180/197; 701/84, 701/85, 86

(56) References Cited

U.S. PATENT DOCUMENTS 4,785,904 A * 11/1988 Leiber et al.
5,351,779 A * 10/1994 Yamashita
6,041,276 A * 3/2000 John et al.
6,182,003 B1 * 1/2001 Maeier-Landgrebe

FOREIGN PATENT DOCUMENTS

| DE | 44 30 108 | 2/1996 |
| EP | 0 705 177 | 4/1996 |
| WO | WO-97/40998 A1 * | 6/1997 |

* cited by examiner

*Primary Examiner*—Kevin Hurley
(74) *Attorney, Agent, or Firm*—Kenyon & Kenyon

(57) ABSTRACT

A method and a device for controlling a drive unit of a motor vehicle. In this context, in response to a tendency to spin of at least one drive wheel, the torque of the drive unit is reduced. The reduction of the torque, in this context, is limited to a minimum value, which is preferably a function of the prevailing driving situation.

9 Claims, 3 Drawing Sheets

METHOD AND DEVICE FOR CONTROLLING A DRIVE UNIT OF A MOTOR VEHICLE

BACKGROUND INFORMATION

European Patent No. 705 177 describes a method and a device for controlling a drive unit, in which the drive torque is measured, which is the maximum that can be transferred from the drive to the street. In this context, the drive torque is, calculated by taking into account the air resistance, the rotational resistance torque, the acceleration resistance torque, etc., and from this, a drive torque is determined for the drive unit of the vehicle, corresponding to the maximum transferable drive torque under the prevailing conditions. If instability should occur in at least one drive wheel, i.e., if this drive wheel shows a tendency to spin, the torque of the drive unit is reduced to the drive torque that is calculated to be the maximum possible.

When starting up on roadways having a lower coefficient of friction, e.g., on snow or ice, the drive wheels, due to their high drive torque (caused by a powerful excess torque in first gear), very frequently begin to slip significantly. The known solution counteracts this increased slipping by engaging the engine and, optionally, the brakes, as described, it being possible in these situations, as a result of the slowly accumulating acceleration of the vehicle connected with high slipping at a relatively low drive torque, that the reduction of the drive torque can turn out to be so pronounced that the slipping is completely eliminated. If the drive wheels take on the velocity of the reference wheels, then the acceleration of the motor vehicle declines. Associated with this is a pitching of the vehicle, which is felt by the driver subjectively to be extremely uncomfortable and intrusive.

The same applies, outside the start-up range, in which in some situations on roadways having a lower coefficient of friction, a powerful reduction of the drive torque takes place as a result of the engagement of the anti-spin regulator. This is especially the case when the drive wheels have significant slipping in response to a change in the coefficient of friction of the roadway (e.g., in the transition from snow to an ice plate). Since, apart from the start-up range, in a situation of significant slipping, a stability-endangering state cannot be excluded, in particular during cornering, the torque reduction takes place very rapidly, resulting frequently that, here too, the velocities of the drive wheels are reduced to very close to the reference velocity. A corresponding pitching of the motor vehicle is the consequence.

A different problem area is represented by the so-called "power start" (starting up with squealing, spinning drive wheels) on roadways having a high coefficient of friction. This situation can also arise in a gradual start-up, for example on wet roadways. Here too, the drive wheels can experience significant slipping. An engagement of the anti-spin regulation, here too, causes a very significant acceleration slump, which is also felt by the driver to be very unpleasant.

It is an object of the present invention to improve the control of a drive unit such that the disadvantages described do not arise or are reduced, without significantly impairing the stability or the traction of the motor vehicle.

German Patent No. 44 30 108 describes a procedure in which the coefficient of friction of a roadway is estimated on the basis of the drive torque of the vehicle and the wheel slip of at least one drive wheel.

SUMMARY OF THE INVENTION

As a result of the procedure described below, the aforementioned disadvantages are effectively eliminated or reduced. This is due to the fact that by stipulating a minimal drive torque for engaging the anti-spin regulation, an excessive, uncomfortable reduction of the drive torque is avoided and the control comfort of the anti-spin regulator is significantly increased, while maintaining stability and traction.

It is particularly advantageous that, as a result of the use of the procedure described below, a uniform start-up is made possible on roadways having a lower coefficient of friction, the drive wheels rotating in state of continual slipping. This has particular advantages in vehicles having fewer cylinders, in which the torque reduction is realized by limiting the fuel injection pulses. The procedure described below effectively avoids an uncomfortable process, the so-called engine shaking, in response to the engaging of the anti-spin regulation.

In an advantageous manner, the start-up process of the motor vehicle is improved, since, despite the spin detected by the anti-spin regulator, the value for the torque cannot sink below the minimum reducing torque due to the drive torque reduction, so that the start-up in a continuous slip can take place without the motor vehicle pitching. In an advantageous manner, the regulation can be adjusted, apart from the start-up range, such that maximum stability is achieved with the greatest possible comfort.

In a particularly advantageous manner, the level of the pre-determined minimum torque is a function of the driving situation.

Advantages as a result of the procedure described below are also yielded in regard to roadways having a high coefficient of friction or wet roadways, in which an elevated torque is required in order to carry out a so-called "power start." The acceleration slump caused by the engagement of the anti-spin regulation is reduced, or ideally prevented.

DETAILED DESCRIPTION

Figure 1:
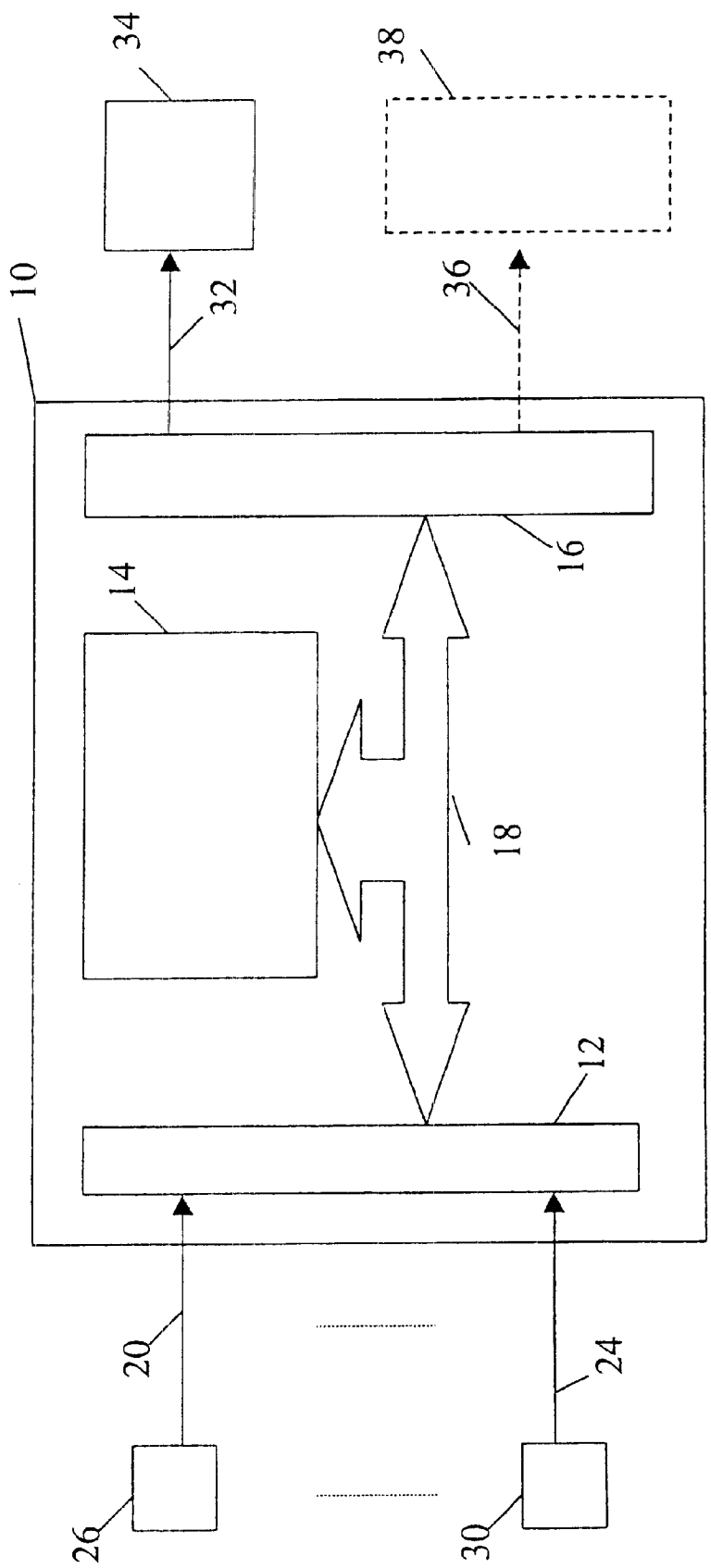
FIG. 1 shows a general block diagram of a control device for controlling the drive unit of a motor vehicle within the context of an anti-spin regulator.

FIG. 1 depicts a control unit 10, which includes at least one input circuit 12, at least one microcomputer 14, and at least one output circuit 16. These elements are connected to each other by communication system 18 for reciprocal data exchange. Input circuit 12 has supplying it input leads, via which signals are conveyed that represent performance quantities or from which performance quantities can be derived. In FIG. 1, for reasons of simplicity, only input leads 20 through 24 are depicted, which convey signals that represent the velocities of the wheels of the motor vehicle. These velocities are measured in measuring devices 26 through 30. In addition, depending on the exemplary embodiment, further quantities are supplied, especially those that are evaluated in the context of the procedure described below for determining the maximum transferable drive torque, for determining the minimum drive torque, and for determining the prevailing driving situation. In this context, it is preferably a question of the torque of the drive unit, a quantity that represents the coefficient of friction between the wheels and the roadway (assuming it is not estimated, as occurs in the related art), as well as further quantities evaluated as described below. In addition, quantities are supplied which are utilized for carrying out the anti-spin regulation and, optionally, further functions, which are carried out by-control unit 10.

Via output circuit 16 and the output leads connected thereto, control unit 10 yields regulated quantities at least in the context of the anti-spin regulation carried out in control unit 10. In the preferred exemplary embodiment, control element 34 is the throttle valve of an internal combustion engine, which is actuated via lead 32 by an appropriate regulated quantity. In other exemplary embodiments, a setpoint value is provided for at least one of the performance quantities of the drive unit, in particular for the engine torque, which is adjusted, as control element 34, via the engine control system. In advantageous exemplary embodiments, in addition, brake system 38 of the motor vehicle is actuated via the at least one output lead 36, alternatively or as a supplement to the engagement in the drive unit, braking force being applied to least one drive wheel, the rotating one, in response to the presence of drive slip.

In addition, or as an alternative, to the engagement possibilities described, other possibilities are available in accordance with the specific exemplary embodiment. For example, in one exemplary embodiment, in addition or as an alternative to controlling via the throttle valve, the ignition angle of the internal combustion engine and/or the fuel supply is controlled along the lines of suppressing individual injections through the direct input of corresponding performance quantities along the lines of the engine control in the context of realizing the stipulated setpoint value.

In the context of the anti-spin regulator, the slipping of at least one drive wheel is determined preferably with relation to a reference quantity, which is derived from at least one wheel velocity signal of at least one other wheel. In accordance with the related art cited above, in the preferred exemplary embodiment, the maximum transferable drive torque is also measured. If the drive slip exceeds, in at least one drive wheel, a pre-selected limit value, which indicates a tendency of this drive wheel to spin, the drive wheel is braked (select-high mode) and/or the drive torque is reduced to the maximum transferable (select-low mode). In response to the spinning of the drive wheel, the drive torque is then adjusted in accordance with.the, maximum transferable drive torque until the tendency of the drive wheel to spin recedes or disappears. In order to avoid the disadvantages cited above, the reduction of the drive torque is limited to a preselected minimum value, below which the value cannot sink. This minimum value is established, in particular, as a function of the currently prevailing driving situation, for the driving situation the selection being made of driving on a roadway of lower coefficient of friction, the start-up range, or cornering. In this context, depending on the exemplary embodiment, these situations are taken into account individually or in various combinations, in varying priorities with respect to each other.

Figure 2:
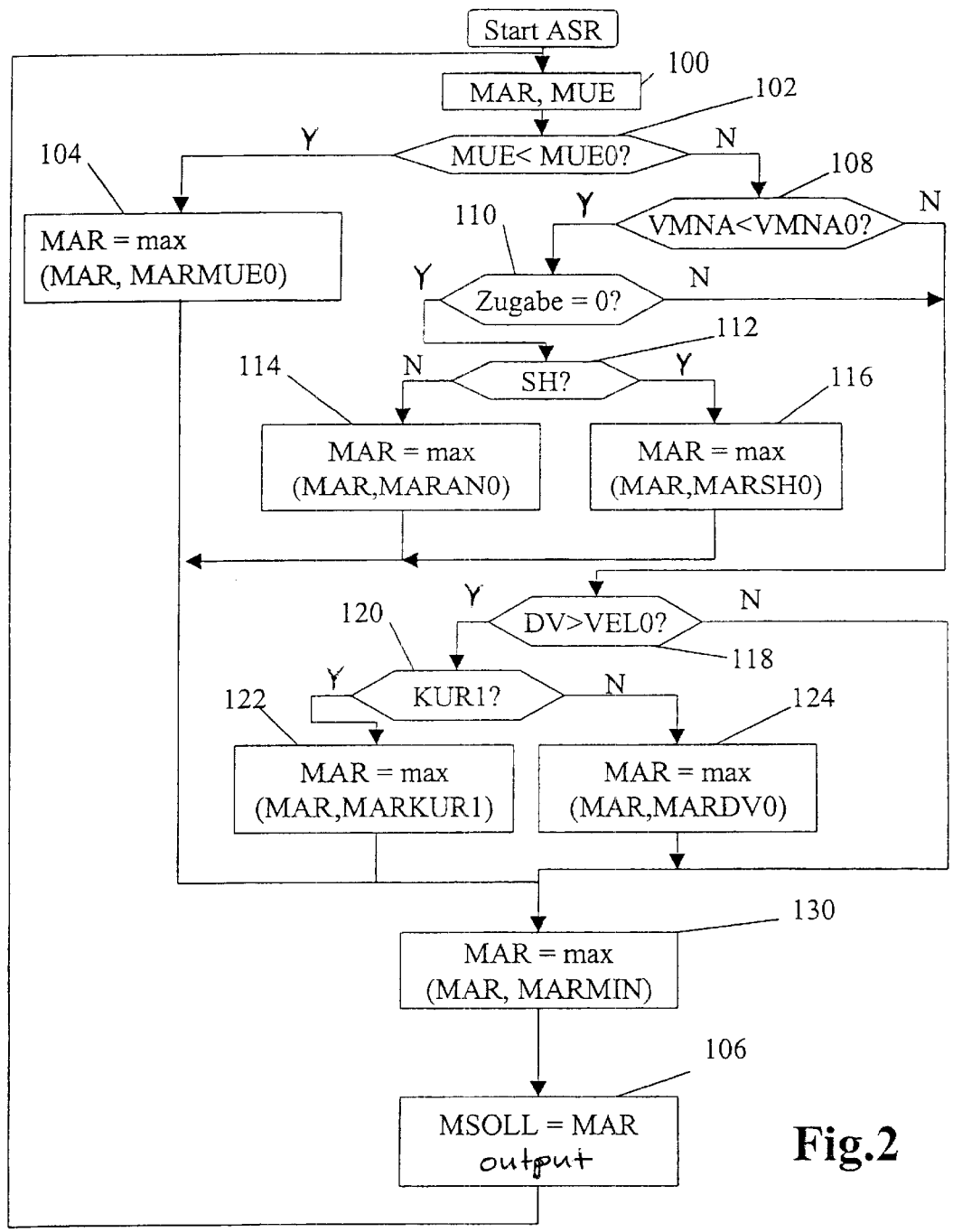
FIG. 2 shows a flowchart, which represents a program of the microcomputer of the control device and which depicts a preferred exemplary embodiment of the minimum limitation of the drive torque when the anti-spin regulator is active.

In the preferred exemplary embodiment, the procedure described is realized in the context of a program of microcomputer 14 of control unit 10. One example for a program of this type is sketched on the basis of the flowchart according to FIG. 2. The program depicted, in this context, is initiated at the commencement of the anti-spin regulation and is abandoned upon termination of the anti-spin regulation.

In first step 100, transferable drive torque MAR, to which the anti-spin regulator seeks to reduce the drive torque of the drive unit, as well as roadway coefficient of friction MUE are read in. In this context, the latter is measured, for example, in accordance with the procedure described in the related art cited above. Thereupon, in step 102, a check test is carried out as to whether the coefficient of friction exceeds a pre-determined limit value MÜE0. This limit value, in this context, is selected such that it delimits the range of roadways having a lower coefficient of friction from other roadway states. A value of 0.3 has proven to be suitable. If the vehicle is on a roadway having a lower coefficient of friction, then, in accordance with step 104, torque MAR is determined as the maximum value of transferable torque MAR and of a minimum value MARMÜE0 stipulated for this driving situation. In one exemplary embodiment, 200 Nm has proven to be a suitable value. In subsequent step 130, measured reduction torque MAR is measured as the maximum value of transferable torque MAR and of an acceleration-dependent value MARMIN. In this context, this value is stipulated such that even in response to a high coefficient of friction as well as to a wet roadway, an acceleration slump caused by the engagement of an anti-spin regulation in a so-called "power start" is minimized or prevented. As the acceleration-dependent value, a value is calculated that is formed from the vehicle acceleration, the vehicle mass, and a preselected constant, preferably as their product. It corresponds to the acceleration torque having a cushioning constant. It only serves as a minimum limit if no ABS engagement takes place, i.e., if no wheel shows a tendency to lock. If this is the case, no minimum limiting takes place.

Subsequently, in step 106, setpoint torque MSOLL to be adjusted is set at measured value MAR and is conveyed to the control device. After step 106, the program is repeated at step 100 until the anti-spin regulation is terminated, i.e., the tendency of the drive wheel to spin has faded away, the torque corresponds to the driver input, and braking engagement is no longer present.

If step 102 has yielded the conclusion that the coefficient of friction of the roadway lies above the limit value, then, in step 108, a check test is carried out as to whether the vehicle is in the start-up range. For this purpose, the vehicle velocity and the average velocity of the non-driven wheels VMNA or of one non-driven wheel is compared with a preselected limit value VMNAO. A value of roughly 25 km/h has proven to be suitable as the limit value. If the vehicle is in the start-up range, then, in step 110, a check test is carried out as to whether the vehicle is in the first control cycle. For this purpose, the check test is carried out as to whether, through the regulator, a torque increase has occurred that is initiated after the disappearance or the reduction of the tendency of the drive wheel to spin. If no supplemental function of this type was active, which is determined on the basis of appropriate markers, then the system is in the first control cycle and a check test is carried out in subsequent step 112 as to whether the anti-spin regulator is in the select-high mode. If it is not in this mode, in which only one drive wheel is spinning and the braking engagement has priority, then, in step 114, drive torque MAR is formed as the maximum value from the transferable value MAR and a limit value MARANO prescribed for this operating situation. Thereafter, in steps 130 and 106 the process continues.

If step 112 has shown that the system is in select-high and not in select-low mode (priority of torque reduction), then the reducing torque, in accordance with step 116, is measured as the maximum value of transferable torque MAR and of a limit value MARSHO stipulated for this situation. Values between 300 Nm for step 114 and 400 Nm for step 116 have proven to be suitable as limit values. Also after step 116, steps 130 and 106 follow.

If the system is not in the start-up range or not in the first control cycle (a no-response in step 108 or 110), then, in step 118, a check test is carried out as to whether the system is engaged in cornering. This takes place through a comparison of differential velocities DV of the non-driven wheels with a preselected limit value VELO, which in the preferred exemplary embodiment amounts to 1.5 km/h. As an alternative, the operating state can be derived from other signals (e.g., steering angle, yaw rate, transverse acceleration, etc.). If the vehicle is engaged in cornering, then, in step 120, on the basis for example of a set mark KUR1, a check test is carried out as to whether the cornering roadway has an average or a high coefficient of friction or is a so-called low-coefficient-of-friction curve. This recognition is based on the observation of the slip of the curve-external wheel pair, which, in low-coefficient-of-friction curves, takes on particularly high values at a given velocity. If the vehicle is in a low-coefficient-of-friction curve, then, in step 122, torque MAR is determined as the maximum value of the measured transferable torque MAR and of a limit value MARKUR1 measured for this driving situation. The latter in a preferred exemplary embodiment amounts to 100 Nm. If the vehicle is on a high-coefficient-of-friction curve, then, in accordance with step 124, reducing torque MAR is measured as the maximum value of transferable torque MAR and of a limit value MARDVO determined for this situation. The latter in the preferred exemplary embodiment amounts to 150 Nm. After step 122 and 124, steps 130 and 106 are carried out.

If step 118 has yielded the conclusion that no cornering is occurring, then steps 130 and 106 follow.

In addition, the option exists in the start-up range to distinguish between vehicles having manual transmissions and automatic transmissions. In this case, the limit value obtained in step 114 is established in different ways for manual transmissions and automatic transmissions, it being higher in manual transmissions than in automatic transmissions.

In one advantageous exemplary embodiment, this limitation is not in effect if an aquaplaning condition has been detected.

Figure 3A:
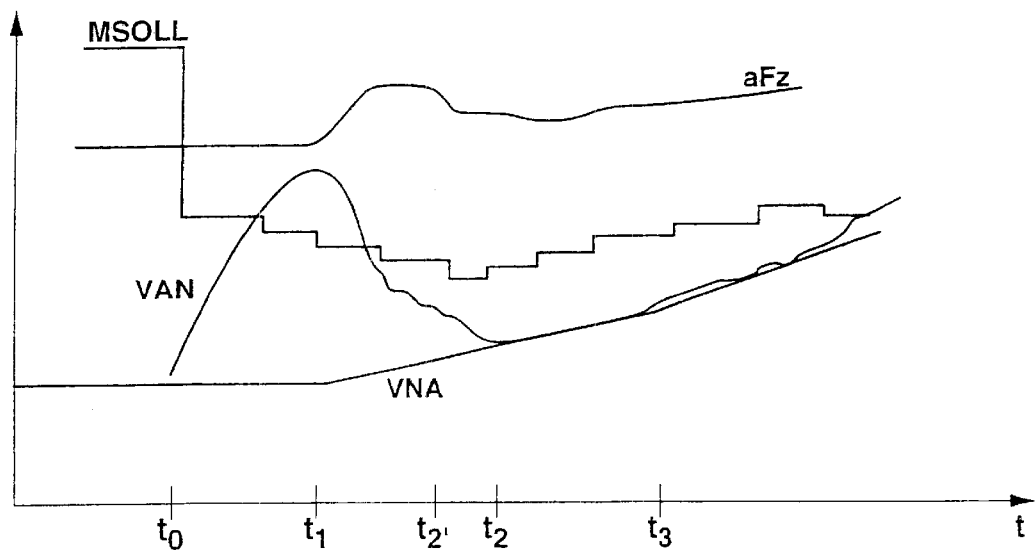
FIG. 3a shows a first timing diagram, which illustrates the advantageous effects of the procedure described below, in comparison with the current art.
Figure 3B:
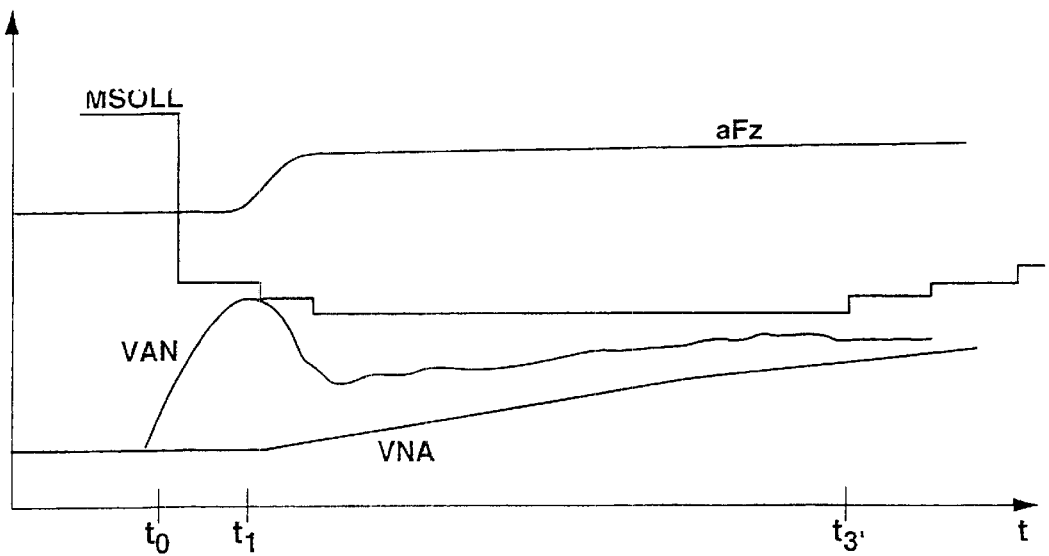
FIG. 3b shows a second timing diagram.

The advantageous effect of the procedure described above is particularly evident in the timing diagrams depicted in FIGS. 3*a* and 3*b*. In this context, FIG. 3*a* depicts the start-up on a snow-covered roadway according to the related art, whereas in FIG. 3*b*, the corresponding driving situation is sketched using the procedure described above. Depicted in FIGS. 3*a* and 3*b* is the temporal curve of torque MSOLL to be adjusted by the engine in the context of the anti-spin regulation, the characteristic curve of the wheel velocity of a selected drive wheel VAN, and at least one selected non-driven wheel VNA, as well as vehicle acceleration AFZ.

Initially, the velocity of the vehicle is kept constant, e.g. zero, and the velocity of the observed drive wheel essentially corresponds to the velocity of the non-driven wheel, so that no engagement of the anti-spin control is provided for. Accordingly, the vehicle acceleration is also constant and the setpoint torque is at a maximum value. At time point t0, at the observed drive wheel the tendency to spin is detected, since the velocity of this wheel is greater than that of the selected non-driven wheel. Accordingly, a setpoint torque is calculated as the maximum transferable torque, to which the engine torque is to be reduced. Beginning at time point t0, the anti-spin regulator is active. As a consequence of the powerfully increasing slip, the setpoint torque is further reduced. Beginning at time point t1, the tendency of the drive wheel velocity changes so that the velocity and the acceleration of the vehicle increase. As a consequence of the significant slipping that is also present, the torque is further reduced. At time point t2, the velocity of the drive wheel reaches that of the non-driven wheel. The tendency to spin has disappeared, and the torque reduction is terminated. In this context, it is particularly uncomfortable that in this situation the acceleration of the vehicle (compare T2') suddenly decreases. After t2, the torque is increased again as a consequence of the absence of the slipping, and the vehicle accelerates at a reduced rate of acceleration.

A vehicle acceleration that is once again decreasing (pitching) as a consequence of the torque reduction is very uncomfortable and is avoided using the procedure described in FIG. 3*b*. Here too, at time point t0, a drive slip is detected, which is to be reduced by reducing the engine torque. At time point t1, the torque reduction shows its effect. The velocity of the non-driven wheel increases, just as does the vehicle acceleration. As a consequence of the still significant slipping, the torque is further reduced, as is also shown in FIG. 3*a*, but it is maintained at a lower limit value MARMIN. This has as a consequence that the velocity of the driven wheel does not sink to the velocity of the non-driven wheel and there is no acceleration slump. Rather, the vehicle accelerates at an essentially constant acceleration, while the drive wheel runs in a continuous slip. Only with the reduction of this slip at time point t3 is a supplement to the torque begun, in order to take the vehicle from a situation of anti-spin regulation.

What is claimed is:

1. A device for controlling a drive unit of a motor vehicle, comprising:
   a control unit receiving a signal indicating whether a tendency to spin of at least one drive wheel of the vehicle has been detected, the control unit providing an output signal for reducing a torque of the drive unit if the tendency to spin has been detected, the control unit including a microcomputer, the microcomputer including a program which limits a quantity of the output signal to a minimum value;
   wherein the minimum value is at least one of
      a function of a driving situation,
      a function of an operating mode of an anti-spin regulator,
      prescribed when the vehicle is engaged in cornering,
      a function of a coefficient of friction of a cornering roadway,
      is prescribed if none of predefined driving situations arises,
      a function of an acceleration of the vehicle, and
      a function of a type of transmission.

2. A method for controlling a drive unit of a motor vehicle, comprising the steps of:
   reducing a torque of the drive unit in response to an occurrence of a tendency to spin at at least one drive wheel of the vehicle; and
   limiting a quantity of the reduced torque of the drive unit to a minimum value, wherein the minimum value is a function of a driving situation.

3. A method for controlling a drive unit of a motor vehicle, comprising the steps of:

reducing a torque of the drive unit in response to an occurrence of a tendency to spin at at least one drive wheel of the vehicle; and limiting a quantity of the reduced torque of the drive unit to a minimum value, wherein the minimum value is a function of an operating mode of an anti-spin regulator.

4. A method for controlling a drive unit of a motor vehicle, comprising the steps of:

reducing a torque of the drive unit in response to an occurrence of a tendency to spin at at least one drive wheel of the vehicle; and limiting a quantity of the reduced torque of the drive unit to a minimum value, wherein the minimum value is prescribed when the vehicle is engaged in cornering.

5. A method for controlling a drive unit of a motor vehicle, comprising the steps of:

reducing a torque of the drive unit in response to an occurrence of a tendency to spin at at least one drive wheel of the vehicle; and limiting a quantity of the reduced torque of the drive unit to a minimum value, wherein the minimum value is a function of a coefficient of friction of a cornering roadway.

6. A method for controlling a drive unit of a motor vehicle, comprising the steps of:

reducing a torque of the drive unit in response to an occurrence of a tendency to spin at at least one drive wheel of the vehicle; and limiting a quantity of the reduced torque of the drive unit to a minimum value, wherein the minimum value is prescribed if none of predefined driving situations arises.

7. A method for controlling a drive unit of a motor vehicle, comprising the steps of:

reducing a torque of the drive unit in response to an occurrence of a tendency to spin at at least one drive wheel of the vehicle; and limiting a quantity of the reduced torque of the drive unit to a minimum value, wherein the minimum value is a function of an acceleration of the vehicle.

8. A method for controlling a drive unit of a motor vehicle, comprising the steps of:

reducing a torque of the drive unit in response to an occurrence of a tendency to spin at at least one drive wheel of the vehicle; and limiting a quantity of the reduced torque of the drive unit to a minimum value, wherein the minimum value is a function of a type of transmission.

9. A method for controlling a drive unit of a motor vehicle, comprising the steps of:

reducing a torque of the drive unit in response to an occurrence of a tendency to spin at at least one drive wheel of the vehicle;

limiting a quantity of the reduced torque of the drive unit to a minimum value; and canceling the limiting if at least one of an aquaplaning and a locking tendency of one wheel of the vehicle is detected.

* * * * *